May 26, 1942.                J. C. WHITESELL, JR                2,284,483
                                DRESSING TOOL
                              Filed May 26, 1938
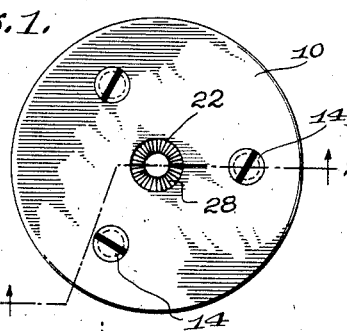
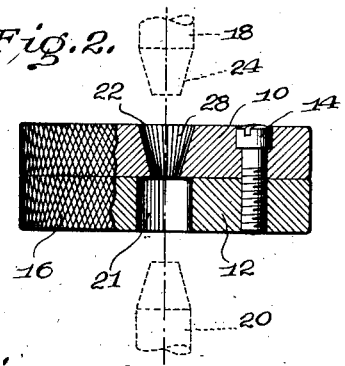
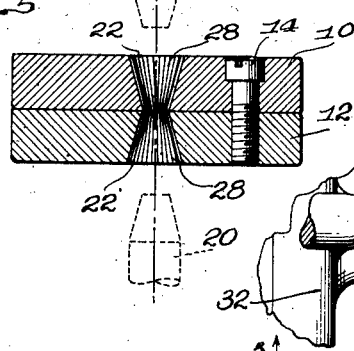
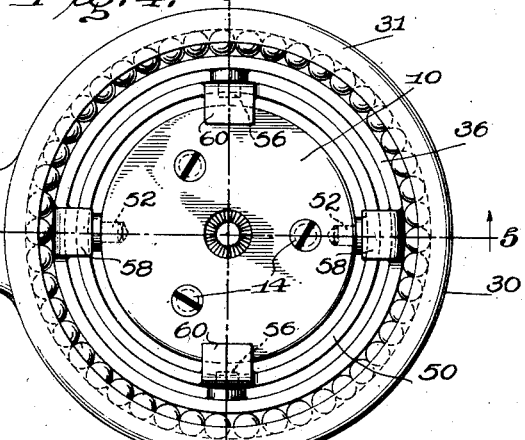
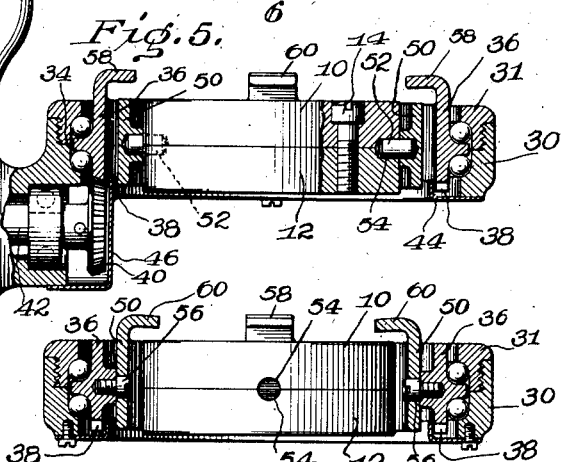
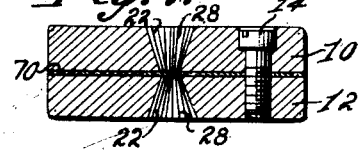
INVENTOR:
John C. Whitesell, Jr.
BY John P. Tarbox
ATTORNEY Patented May 26, 1942

2,284,483

UNITED STATES PATENT OFFICE 2,284,483

DRESSING TOOL

John C. Whitesell, Jr., Norristown, Pa., assignor to Edward G. Budd Manufacturing Company, Philadelphia, Pa., a corporation of Pennsylvania Application May 26, 1938, Serial No. 210,110

13 Claims. (Cl. 90—12)

This invention relates to electric welding and more particularly to a method and apparatus for maintaining and preparing welding contacts in proper condition for spot-welding.

In the art of spot welding, and, particularly the welding of thin sheets, where small welds are required and accuracy more essential, the shape of the electrode tips plays an important factor in the type of weld resulting, and in aircraft work particularly, it is essential that each and every weld be uniform of the prerequisite maximum high strength permissible without weakening the welded members. Only by such uniformity can the maximum advantages be attained from the use of welding over other types of fastenings.

The present invention is therefore directed to a novel means for trimming and shaping welding electrodes, as well as the method employed in so shaping, and an object of the invention is to provide a tool, capable of forming quickly and readily the tips of electrodes, so that throughout their frequent use, they will be maintained in proper shape and produce uniform spot welds.

A further object of the invention is to provide a tool for shaping electrode tips and which is capable of aligning pairs of electrodes so that perfect matching in accordance with set requirements is easily accomplished.

Another object of the invention relates to the method of dressing electrodes singly and in pairs, whereby uniformity of tip shape may be easily maintained without serious layup of tools.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the several views:

Fig. 1 represents a top plan view of a simple form of the invention adapted for hand use.

Fig. 2 illustrates a section through Fig. 1 taken on the line 2—2.

Fig. 3 illustrates a section similar to Fig. 2 of a modified tool for shaping two opposed electrodes at the same time.

Fig. 4 is a top plan view of a power operated modification of the tool.

Fig. 5 is a section through Fig. 4 taken on the line 5—5.

Fig. 6 is a section taken through Fig. 4 on the line 6—6.

Fig. 7 is a sectional view of a modified form.

Referring to the drawing and more particularly to the arrangement shown in Figs. 1 and 2, the tool will be seen in its form adapted for manual use. The tool comprises top and bottom discs 10 and 12 fastened together by suitable fastening means such as screws 14, and which discs are conveniently knurled around their peripheries as shown at 16. For the purpose of shaping the electrodes 18 and 20, diagrammatically shown in Fig. 2, the top disc is provided with a conical frustum bore 22 conforming to the ultimate shape of electrode point desired, one form being illustrated at point 24 on electrode 18. The conical bore is provided with elemental cut away portions providing cutting teeth 28 adapted to cut away the electrode metal as the tool is rotated while in engagement therewith.

The bottom half of the tool 12 may have a plain bore 21 aligned with the conical bore 22, but adapted to make a fairly close fit on the cylindrical portion of the lower electrode for guiding purposes and, in practice, it will be found desirable to squeeze the electrodes together with the tool therebetween, thereafter rotating the tool until it rotates free, as a result of the opposed tips touching at the frustum of the cone. The disc may then be turned upside down and the lower electrode treated in the same manner. Thereafter emery cloth, or other abrasive in a plane form is passed between the tips to reduce the extreme tip ends to plane parallel faces, resulting in the tips being shaped for the most desirable welding operation. It will be understood that tips, accurately shaped in this manner, may be employed in conjunction with accurately measured current quantities and time constants to produce substantially perfect uniform welds.

In Fig. 3, a modified form of the device is illustrated wherein both halves are provided with conical frustum openings with cutting edges, so that cutting of both electrodes can be effected at the same line.

Since in practice, it may be desirable to apply power to rotate the tool, in Figs. 4, 5 and 6 there is illustrated an adaptation for power operation. Since it is desirable that the tool be permitted to align itself to the axis of the electrodes, or act just as it would when hand operated, but with greater cutting speed, the tool is mounted in a power driven ring through the use of gimbels, which provide universal movement. In this modification there is provided a frame annulus 30 forming a part of a motor frame 32. The annulus forms a double ball bearing race 34, and can be made in two parts 30 and 31 so that assembly around a complementary ball bearing mounted rotatable ring drive member 36 can be effected. The ring member carries bevel gear teeth 38 on its lower edge engageable with bevel teeth 40 of a gear on a motor drive shaft 42. An annular guard 44 having a tongue 46 may be conveniently arranged to protect the gears from chips, etc. The tool which may be like Figs. 1 and 2 or Fig. 3 is mounted in an intermediate ring 50 having a pair of inwardly extending trunnions 52 journaled in semi-circular bearing recesses 54 half in each disc 10 and 12. The ring 50 is in turn journaled on a pair of trunnions 56 secured in the drive ring 36. Tongues 58 and 60 on the rings 36 and 50 may operate to limit the extent of universal movement, as in some instances it is desirable to keep the angularity at a minimum.

In practice emery cloth 70 (see Fig. 7) in disc form may be clamped between the discs 10 and 12 and thus the plane end face of the electrodes can be effected immediately at the termination of the cutting of the conical shape. In practice, no trouble is occasioned by jamming of chips from the cutting tool because of the conical opening tending to naturally and efficiently eject such cuttings and grindings as result from electrode treatment.

In operating the power driven tool, substantially the same mode of treatment is used as in the case of the hand tool, the points being moved together under slight compression while the tool is in place, and the trimming being effected until by "feel" it is ascertained that the points are trimmed.

There is thus provided a novel tool for the treatment of welding electrodes which facilitates maintaining proper efficient shape for accurate welding and though several embodiments and modifications of the invention have been illustrated and described, it is to be understood that the invention is not limited thereto but may be embodied in various mechanical arrangements. For example, the source of power may be removed to a remote position and transmitted to the tool through a flexible conduit and cable, the motor frame in such an instance reducing itself to a mere handle. As such and many other changes in construction and arrangement of parts may be made without departing from the spirit of the invention, as will be apparent to those skilled in the art, reference will be had to the appended claims for a definition of the limits of the invention.

What is claimed is:

1. In a tool for shaping welding electrode tips, a pair of discs arranged back to back, and each having a bore therein of a conical frustum shape corresponding to a desired electrode tip shape, and elemental spaced grooves along the bore forming elemental cutting edges lying in the locus of said conical frustum shape.

2. In a tool for shaping welding electrode tips, a pair of discs arranged back to back, and each having a bore therein of a conical frustum shape corresponding to a desired electrode tip shape, and elemental spaced grooves along the bore forming elemental cutting edges lying in the locus of said conical frustum shape, and means removably securing said discs in back to back relation.

3. In a tool for shaping welding electrode tips, a pair of discs arranged back to back, and each having a bore therein of a conical frustum shape corresponding to a desired electrode tip shape, and elemental spaced grooves along the bore forming elemental cutting edges lying in the locus of said conical frustum shape, and knurling around the outer periphery of each disc to afford manual gripping.

4. In a tool for shaping welding electrode tips, a pair of discs arranged back to back, and each having a bore therein of a conical frustum shape corresponding to a desired electrode tip shape, and elemental spaced grooves along the bore forming elemental cutting edges lying in the locus of said conical frustum shape, means removably securing said discs in back to back relation and knurling around the outer periphery of each disc to afford manual gripping.

5. In a tool for shaping welding electrode tips, a disc having a conical cutting bore for cutting a suitable shape electrode tip, a universal mounting for the disc, and power means for rotating the disc through said universal mounting.

6. In a tool for shaping welding electrode tips arranged in axially aligned pairs, a pair of discs having aligned central bores extending into one another, at least one of which is shaped to cut the side walls adjacent the electrode tip in accordance with a selected shape, and the other bore permitting approach of the two electrodes toward one another during cutting whereby upon the tips contacting, cutting action ceases.

7. The method of trimming a pair of axially aligned welding electrode tips with a die having intersecting conical cutting edges which comprises cutting the side adjacent both tips simultaneously to form a conical frustum on each tip while urging said tips toward one another, continuing the cutting action until the opposite tips contact one another, and thereafter flattening the tip ends to form parallel flat contact surfaces.

8. In a tool for shaping welding electrode tips, an annular frame, drive means comprising a ring journaled in said frame, a cutting and shaping tool within said ring, and a gimbel ring connecting the tool to said drive ring whereby a universal drive is effected.

9. In a tool for shaping welding electrode tips, an annular frame, drive mens comprising a ring journaled in said frame, a cutting and shaping tool within said ring, and means for effecting a universal drive from said drive ring to said tool.

10. In a tool for shaping welding electrode tips, a pair of discs, each having a central aperture of a shape corresponding to the tip shape desired, cutting edges lining said aperture, and a flat surface cutting means clamped between the discs.

11. The method of trimming a pair of axially aligned welding electrode tips with a die having intersecting conical cutting edges which comprises cutting the side adjacent both tips simultaneously to form a conical frustum on each tip while urging said tips toward one another, continuing the cutting action until the opposite tips contact one another, and thereafter dressing the tip end surfaces to form suitable welding contact surfaces.

12. In a tool for shaping welding electrode tips, a pair of discs arranged back to back, and each having bores therein aligned with one another and one of which has a substantially conical frustum shape corresponding to a desired electrode tip shape, and substantially elemental spaced grooves along the one bore forming substantially elemental cutting edges lying in the locus of said substantially conical frustum shape.

13. In a tool for shaping axially aligned welding electrode tips, a disc having a bore therethrough of a conical frustrum shape, elemental cutting edges along the conical wall of said bore extending to the smaller end thereof and said bore being constructed and arranged whereby upon cutting a tip and urging it toward its opposed tip, cutting action may be limited by contact of one tip with the other, an annular ring member having pivotal connection at diametrically opposed points with said disc, a second ring member having pivotal connection at diametrically opposed points with said first ring member the axis of said second pivotal connection being at ninety degrees with respect to the axis of said first pivotal connection, a housing for said second ring member, said second ring member being journalled in said housing, and means for rotating said second ring member in said housing.

JOHN C. WHITESELL, Jr.